United States Patent Office 2,981,250
Patented Apr. 25, 1961

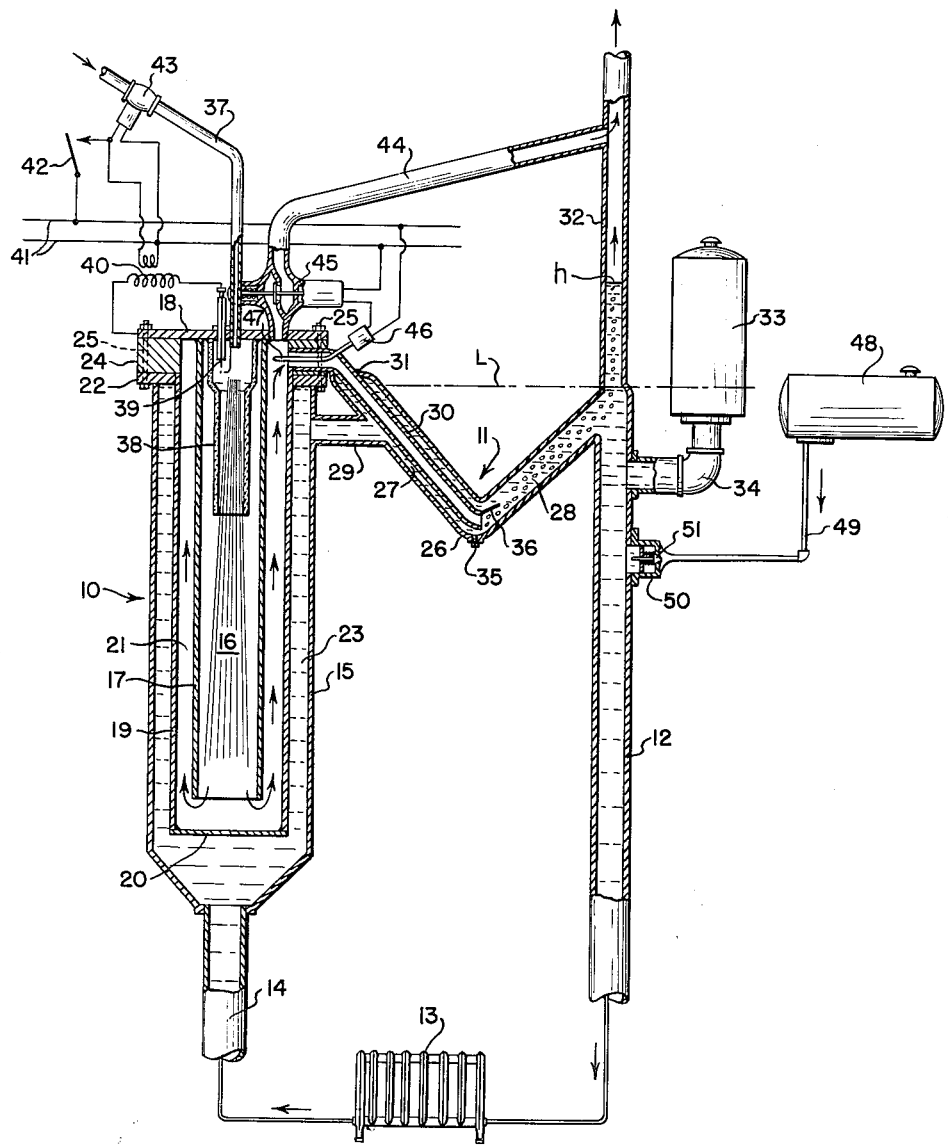

2,981,250
SUBMERGED COMBUSTION HEATING APPARATUS

Richard M. Stewart, Irvington, N.Y.
(Central Road, Middlebury, Conn.)

Filed Feb. 7, 1958, Ser. No. 713,901

12 Claims. (Cl. 126—360)

This invention relates to submerged combustion heating, and is particularly directed to the provision of a new submerged combustion heater adapted for intermittent operation. The new heating apparatus is admirably suited for use in connection with domestic hot water space heating systems; but it can be used with advantage for many other purposes as well, such as providing hot water for domestic or commercial dishwashing or laundry, providing a circulation of hot water in hotels and other commercial or manufacturing operations, and concentrating liquors by evaporation. Basically the new heating apparatus is designed for passing hot combustion gas in heat exchange relation with the liquid to be heated while maintaining them physically separate until the combustion gas has been partially cooled, and then delivering the partially cooled gas into direct contact with the liquid beneath the surface thereof.

It has long been recognized that submerged combustion affords a particularly efficient means for heating liquids. The term "submerged combustion" is used to denote a heating system in which the hot gaseous products of combustion of a fuel are caused to bubble up through a liquid to be heated; and because of the direct contact of the combustion gas with the liquid the transfer of heat to the liquid is rapid and substantially as complete as possible. Submerged combustion heating apparatus therefore may be more compact than other types of heating apparatus having equivalent heat transfer capacity, and it permits more efficient utilization of fuel for heating purposes than does any other simple form of heating apparatus.

Numerous different designs of submerged combustion heating devices have been developed, but despite the advantages of this method of heating liquids it has been used only to a limited extent, and generally only for specialized industrial purposes such as evaporation and concentration of aqueous solutions. This is owing to two serious drawbacks to submerged combustion heaters heretofore known: They are generally very noisy, and they are generally difficult to re-ignite after the flow of fuel has been discontinued.

The noisy quality of submerged combustion heating apparatus is due to the very rapid chilling from a high temperature and the consequent sudden contraction of combustion gas bubbles ascending through the liquid being heated. The phenomenon is akin to that which produces a thunderclap following a lightning flash, and the noise incident to operation of heretofore known submerged combustion heaters is in fact that of a continuous procession of closely spaced thunderclaps. The difficulty incident to igniting a submerged combustion burner is due to the fact that it is submerged in a liquid, and is under a back-pressure equal to the hydrostatic head of the liquid. When the flow of fuel has been shut off, liquid backs up into the combustion chamber, making it necessary to lift the combustion chamber from the liquid to ignite the fuel, and then to re-insert it beneath the surface of the liquid. Even if the burner itself is located above the level of the liquid, the back-pressure due to the hydrostatic head of liquid makes ignition without causing an explosion difficult. Consequently the most successful submerged combustion heating apparatus heretofore developed has been designed for continuous operation, not requiring periodic extinction and re-ignition of the fuel, and for industrial uses wherein noisiness can be accepted as a part of the price of high efficiency.

The present invention provides an improved submerged combustion heating apparatus which quite effectively overcomes the above mentioned disadvantages. The new apparatus operates with substantially no more noise than that due to bubbling of a gas up through the column of liquid, and it is particularly adapted to repeated discontinuance of fuel flow followed by reestablishment of such flow and re-ignition of the fuel in the combustion chamber. The first of these results is achieved largely by the provision of a combustion gas cooling chamber arranged in heat exchange relation with a liquid preheating chamber, by means of which the hot combustion gas is cooled somewhat and the liquid is preheated out of contact with each other before the gas is passed into direct contact with the liquid. The second result is attained largely by arranging the combustion chamber and the combustion gas cooling chamber so that liquid from the submerged combustion heating chamber cannot back up into them, and by providing a by-pass through which the combustion gas is vented directly to the atmosphere and so is relieved of any superatmospheric back pressure at the time of ignition and during the initial warm-up period of burner operation.

The new submerged combustion heating apparatus comprises a combustion chamber which is preferably of tubular form and vertically disposed, with provision for introducing and igniting fuel at its upper end, and with its lower end open. A gas cooling chamber is disposed about the combustion chamber and preferably is defined by a heat exchange tube surrounding the combustion chamber in spaced relation therewith, the heat exchange tube having its lower end closed and spaced from the lower end of the combustion tube. A liquid preheating jacket, preferably of tubular form, surrounds the heat exchange tube. A heating chamber for containing a liquid to be heated communicates with the interior of the preheating jacket adjacent the upper end thereof; and a combustion gas delivery conduit communicating with the interior of the gas cooling chamber adjacent its upper end extends to beneath the surface of liquid in the heating chamber.

Means are provided by prevent liquid from backing up through the gas delivery conduit into the gas cooling chamber. To this end the gas delivery conduit advantageously extends for a part of its length to a height substantially above the normal surface level of liquid in the heating chamber (or other part of the system). Also, if desired, a check valve may be associated with the gas delivery conduit, preferably adjacent its lowermost end beneath the surface of liquid in the heating chamber, to prevent liquid from surging up through the gas delivery conduit.

A vent conduit communicating with the heating chamber provides for venting spent combustion gas to the atmosphere. A by-pass conduit directly connects the upper end of the gas cooling chamber with the vent. A valve is included in the by-pass conduit, and thermostatic means are provided for controlling the valve, including a temperature sensing element extending into the path of flow of the combustion gas, preferably adjacent the upper end portion of the gas cooling chamber. The valve is thereby maintained open and combustion gas is enabled to by-pass the heating chamber until the temperature of the combustion gas leaving the gas cooling chamber rises to a predetermined value and causes the valve to close.

A preferred embodiment of the invention, in a system for supplying hot water to a space heating radiator, is shown in schematic form in the single figure of the accompanying drawings.

The apparatus shown in the drawings comprises a combustion unit 10 in which fuel is burned and a heating unit 11 in which water (the liquid medium employed in this embodiment) is heated. The combustion and heating units are located near the high point in the heating system. Hot water passing from the heating unit flows through a downcomer 12 to and through a radiator 13. The cool water discharge from the radiator then ascends through a riser 14 to the interior of a preheating jacket 15 associated with the combustion unit, and thence again to the heating unit 11.

The combustion unit comprises a vertically disposed combustion chamber 16 defined by the interior of a refractory combustion tube 17. The combustion tube may be of ceramic material, but preferably is of a metal capable of withstanding attack by the hot gases to which it is exposed. When ordinary city gas is the fuel employed, and it is burned in air, a length of metal pipe forms a very satisfactory combustion tube. The combustion tube is welded or otherwise firmly secured to a header plate 18.

A heat exchange tube 19 surrounds the combustion tube in spaced relation with it. The lower end of the heat exchange tube extends a little below the lower edge of the combustion tube, and is closed by a closure plate 20. The heat exchange tube defines an annular combustion gas cooling chamber 21 between its inner surface and the outer surface of the combustion tube. The heat exchange tube should of course be metallic, and preferably should not be very thick, so it will transmit heat easily. A thin-walled tube of copper or cupreous alloy is preferable for making the heat exchange tube, both for its high heat conductivity and its resistance to corrosion, but a steel tube, or a tube of other material, may be used if desired. The heat exchange tube is welded or otherwise firmly attached at its upper end to a header flange 22.

The preheating jacket 15 surrounds the heat exchange tube 19, in spaced relation with it, and likewise is welded or otherwise firmly attached to the header flange 22. A preheating jacket chamber 23 is formed by the annular space between the heat exchange tube and the jacket. The riser 14 is joined to the jacket 15 at its lower end, to admit water returning from the radiator to the jacket chamber. The jacket 15 is advantageously of copper or a cupreous alloy because of the corrosion resistance of such material, but may be of steel or other material if desired. The assembly of jacket 15, heat exchange tube 19, and flange 22, and the assembly of header plate 18 and combustion tube 17, are joined together by being clamped to opposite faces of a header ring 24 by bolts 25.

The heater unit 11 comprises a tube having an elbow bend 26 and defining an inflow chamber 27 on one side of the elbow and a heating chamber 28 on the other side of the elbow. Both the inflow chamber and the heating chamber slope downwardly toward the elbow, which is the lowermost portion of the heating unit. Communication is provided between the preheating jacket chamber 23 and the inflow chamber 27 by a conduit 29 which connects these two chambers adjacent their upper ends and provides for the flow of water between them.

A combustion gas delivery conduit 30 provides for introducing the combustion gas into direct contact with water in the heating chamber 28. This conduit extends through the header ring 24 into communication with the upper end of the combustion gas cooling chamber 21, and passes down through the interior of the inflow chamber 27 of the heating unit about to the elbow 26. The upper end of the portion of the heater unit tube which forms the inflow chamber 27 is soldered, welded, or otherwise tightly sealed to the gas delivery tube at a point above the liquid conduit 29, as indicated at 31; and the gas delivery tube is itself similarly tightly sealed to the header ring.

The upper end of the portion of the heater unit tube which forms the heating chamber 28 is joined to the upper end of the downcomer 12. A vent pipe 32 discharging to the atmosphere extends upwardly from this junction. A surge or expansion tank 33 containing a reservoir of water is connected to the downcomer by branch pipe 34 which advantageously is of generous cross section, even as great as the downcomer itself. The upper end of the preheating jacket chamber 23 should lie about at the normal surface level L of water in the heating system, and accordingly the tank 33 should be located so that the normal surface level of water therein is at the same height as the upper end of the preheating jacket chamber. The outlet end of the heating chamber 28, where it joins with the downcomer, should be just a little below that height.

Since the points of connection of the system are all well above its low point at the elbow 26, a drain plug 35 or other means for draining the heater unit is advantageously provided at the elbow.

No water is supposed to enter the combustion gas cooling chamber 21. Since the combustion gas delivery conduit forms a path of communication by which a back flow of water might do so, provision is made to prevent it. To this end the combustion gas delivery conduit for a portion of its length (i.e. the portion above the point 31 where it is sealed to the heating unit tube and where its passes through the header ring 24) extends to a height substantially above the normal level L of water in the system. In the apparatus shown in the drawing the height to which the gas delivery conduit extends above the water level L in only that by which the entry of the delivery conduit through the header ring lies above the water level; but if desired the gas delivery conduit may be formed with an upwardly extending loop which carries to as great a height as desired above the water level L. The higher such loop extends, the better able it will be to prevent a backward surge of water from carrying over into the gas cooling chamber; but substantial surges do not occur in normal operation of the system.

Further means to prevent a backward surge of water from carrying up the gas delivery conduit 30 into the combustion gas cooling chamber 21 is provided by a check valve 36 located adjacent the lowermost end of the gas delivery conduit. This check valve is advantageously in the form of a simple thin sheet flap valve hinged to a supporting bracket and arranged to seat against the discharge end of the gas delivery conduit. It should be light enough to be swung easily away from the end of the conduit 30 when combustion gas begins to flow therethrough, and freely enough hinged so as to swing quickly back into sealing engagement with the conduit as soon as the flow of combustion gas stops and a back flow of water begins. It is not necessary for the valve 36 to make a truly water tight seal against the end of the gas delivery conduit. It is quite sufficient if it merely substantially closes the end of the conduit and allows it to fill with water to the normal water level L only slowly. In that way it will serve to prevent any such surge of water up the conduit as could carry through the portion of the gas delivery conduit that extends above the normal water level.

Fuel is admitted into the combustion unit 10 through a fuel inlet pipe 37. The apparatus shown in the drawing is designed for having a proper combustible mixture of gas and air suitably prepared in any desired manner, as by a proportioning pump (not shown), and introduced through the pipe 37; but it is understood that the invention is not limited to any particular type of fuel-air admission or injection system. For purposes of illustration, the simple and very satisfactory use of premixed gas and air is described.

The fuel-air inlet pipe extends about centrally through the header plate 18. A ceramic ignition tube 38 is secured to the header plate about the end of the fuel-air inlet pipe and substantially centrally within the combustion tube 17. Initial ignition of the gas-air mixture is effected by a spark plug 39 which extends through the header plate into the upper interior portion of the ceramic ignition tube 38. The spark plug (one terminal of which is grounded to the header plate 18) is connected to the secondary winding of a high voltage ignition coil 40, the primary of which is connected to an A.C. power line 41 through a switch or relay contact 42. A normally closed solenoid valve 43 may be connected in the gas-air supply line, and the switch or relay contact 42 may be included in the circuit by which this valve, too, is connected to the power line. With such an arrangement the combustible gas-air mixture will be admitted to the combustion chamber only when the spark plug 39 is energized.

A by-pass conduit 44 directly connects the upper end portion of the gas cooling chamber 21 to the vent pipe 32, by-passing the heating unit 11. A thermostatically controlled normally open solenoid valve 45 is included in the by-pass conduit. This valve is connected to the power line 41 through a thermostatic switch 46 which in turn is actuated by a thermostat sensing element 47 extending into the path of flow of the combustion gas near where it leaves the gas cooling chamber. Normally, when no fuel is being burned in the combustion unit and the temperature in the upper end of the gas cooling chamber is low, the solenoid by-pass valve 45 is unenergized and open, and so the gas cooling chamber is vented directly to the atmosphere. When fuel is being burned and the gas passing from the gas cooling chamber has attained the temperature for which the thermostat sensing element 47 and switch 46 have been set, the by-pass valve 45 is energized and closes.

It is desirable to have the by-pass valve 45 open promptly after the admission of fuel and the flow of combustion gas ceases, in order to be sure this valve is open when fuel is again admitted and ignited. Consequently it is sometimes desirable to connect the by-pass valve to the gas delivery conduit a short distance away from the header ring 24, and to insert the sensing element 47 into the gas delivery conduit near such connection. Thereby the sensing element will be in a position where it can cool rapidly, substantially independently of the rate of cooling of the main body of the combustion unit, and cause the valve 45 to open very promptly after shutting off the fuel. Alternatively, the thermostatic switch 46 may be connected to the power line through the switch 42 and through a delayed action relay, whereby closing of the valve 45 may not occur until after a predetermined time (established by the delayed action relay) following closure of the switch 42. The thermostatic sensing element should of course be positioned to lie in the path of flow of the combustion gas whether it is flowing through the heating unit 11 or through the by-pass conduit 44, in order to avoid being effectively removed from position to sense the gas temperature when the path of gas flow is charged by opening or closing of the valve 45.

Although it is preferred to have the by-pass conduit 44 connected to the vent pipe 32 as indicated, the purpose of the by-pass conduit is to open the interior of the combustion unit (the combustion chamber 16 and the gas cooling chamber 21) to the atmosphere; and this purpose may be equally well served merely by opening the by-pass conduit to the atmosphere at any point beyond the valve 45. Hence connection of the by-pass conduit to the vent pipe is not necessary to successful performance of its function, though it is desirable in order to provide an enclosed system having but a simple vent.

The system is operated as follows: The switch 42 is closed, causing the air-fuel admission valve 43 to open and at the same time energizing the ignition spark plug 39. The switch 42 may of course be thermostatically controlled in response to the temperature of the space to be heated by the radiator 13. It may in addition be connected in circuit with a motor for actuating an air-fuel proportioning pump, or other means for delivering fuel alone, or fuel and combustion air, into the combustion unit 10. Such controls and fuel delivery means are well known in the art and are applicable to the above-mentioned submerged combustion burner apparatus in the same manner as they are to heretofore known combustion equipment.

The air-fuel mixture is promptly ignited by the spark plug 39 as it issues from the inlet pipe 37 into the interior of the ignition tube 38. The velocity with which the combustible mixture flows from the pipe 37 should of course exceed the velocity of flame propagation in the mixture, so that it will not back-fire through the inlet pipe. The ignition tube 38 confines the mixture to the vicinity of the spark plug and facilitates prompt ignition when the flow of air-fuel mixture is first begun. In addition, the burning fuel rather quickly heats the ignition tube to a red heat, and it then provides means for insuring quick and uniform ignition over a broad region of the incoming combustible mixture. Consequently the spark plug is not needed to insure continued ignition of the fuel once the ignition tube has been heated, and a time-delay switch or a thermostat switch may be provided to disconnect the spark plug ignition coil from the power line after the ignition tube is hot enough to take over the ignition function. However, as a safety feature, continuous operation of the spark plug for so long as fuel continues to be admitted may be desirable.

The combustion gas and burning fuel flow downwardly through the interior of the combustion chamber and then up through the annular gas cooling chamber 21. A flow path almost twice as long as the combustion unit, over which combustion of the fuel may proceed, is thus provided and enables very complete combustion of the fuel take place in a very compact combustion unit. Heat from the hot combustion gas flowing up through the annular gas cooling chamber is transferred through the heat exchange tube 19 into the water in the jacket chamber 23, thereby preheating the water and correspondingly cooling the combustion gas.

For a brief period after the fuel flow into the combustion tube is begun, while the ignition tube 38, the combustion tube 17, and other parts of the apparatus are being heated, the combustion gas flowing to the upper end of the gas cooling chamber is quite cool. It is during this warm-up period that the greatest difficulty is experienced in maintaining steady burning of the fuel. To facilitate initial ignition, and easy and steady flow of fuel into and through the combustion chamber, the by-pass valve 45 is open during this initial warm-up period. The combustion gas is thus is allowed to escape directly to the atmosphere through the by-pass conduit 44, and is not subjected to any back pressure due to the hydrostatic head of water in the heater unit 11. When the components of the combustion unit have become warmed sufficiently, the temperature of the existing combustion gas becomes high enough to cause the sensing element 47 to energize and close the solenoid by-pass valve 45. Thereupon the combustion gas is directed through the delivery conduit 30 into the heater unit 11, and is discharged into direct contact with the water therein.

The combustion gas passes easily by the check valve 36 and bubbles up through the water in the heating chamber 28. There its temperature rapidly is reduced to substantially that of the water it is in contact with, and the water is correspondingly heated. The combustion gas rises through the heating chamber with no more noise than is involved in the bubbling upwards of its non-condensible components. Evidently this remarkable quietness of operation is due to the fact that the combustion gas has been appreciably cooled out of contact with the water in the gas cooling chamber before being brought into direct contact with the water in the heating chamber. Whatever may be the reason, however, the fact is that the apparatus operates with no substantial or objectionable noise. The cool spent combustion gas escapes from the water as it rises beyond the point of connection with the downcomer 12, and passes to the atmosphere through the vent pipe 32.

Ascent of the combustion gas up through the heating chamber 28 acts as an air lift and carries water an appreciable distance up the vent pipe 32, say, about to the level indicated at $h$. As a result the hydrostatic head in the downcomer 12 exceeds that in the riser 14 and combustion unit 10, and a circulation of water is thereby established down through the downcomer, through the radiator 13, up through the riser 14 and preheating jacket chamber 23, and through the connecting conduit 29 into and through the heating unit 11. Such circulation continues for so long as combustion gas flows up through the heating chamber 28.

Some evaporation of water of course occurs, and must be made up before the water level drops to the point where circulation is impaired. Make-up water can if desired be added to the surge or expansion tank 33; or alternatively a make-up water tank 48 may be provided. This tank is connected to the downcomer 12 (or other part of the system) by a pipe 49 leading to a chamber 50 in which a check valve 51 is mounted. The check valve allows water to flow out of the tank 48 into the water circulation system whenever the water level in the system falls to or below some predetermined position. If desired an alkaline material or other reagent may be added to the water in the make-up tank 48, to neutralize any acid or counteract any other contaminant that may be introduced into the water by direct contact with the combustion gas.

When the space heated by the radiator 13 has reached the desired temperature the switch 42 is again opened (for example, by thermostatic control). Thereupon the fuel admission valve 43 closes and the ignition spark is de-energized. The flow of combustion gas through the heating chamber at once ceases, ending its air lift effect, and the water in the vent pipe subsides to its normal level L. In consequence the circulation of water through the system comes to an end. As the combustion unit cools, the thermostat sensing element cools with it and shortly causes the by-pass valve 45 to open. The combustion unit is then in condition again to be put in operation in the manner as described.

Although heat insulation is not shown in the drawings about any part of the apparatus, it is clear that the combustion unit, the heating unit, and other parts may be insulated as is customary for heating equipment. It is preferable, however, that the region of the device about the temperature sensing element 47 be left uninsulated, especially in installation where cooling of the sensing element by radiation and conduction to the atmosphere is relied on to bring about opening of the by-pass valve 45. Otherwise this valve may be closed when the flow of fuel is resumed after a period of interruption.

It is evident from the foregoing that the heating apparatus of the invention provides for passing the hot products of combustion of the fuel first in heat exchange relation with the water while maintaining them physically separated by means of the heat exchange tube 19, and then, after the gas has become cooled from its initial high temperature to a lower temperature (which is, however, substantially above the temperature to which the liquid has become heated), the partially cooled combustion gas and the partially heated water are brought into direct contact by delivering the gas into the water below the surface thereof. Preferably there is a continuous co-current flow of the gas and water as they pass first in heat exchange relation out of contact with each other (on opposite sides of the heat exchange tube 19 and on opposite sides of the delivery conduit 30) and then in direct contact with each other (in the heating chamber 28).

The above described heating apparatus has a number of advantages. Operation of the apparatus proceeds with notable quietness and freedom from vibration; and the apparatus is significantly more compact and efficient than conventional water heating equipment. Another advantage is that the combustion gas system may be completely sealed, with no opening to the atmosphere except the vent pipe 32, which may extend to some point out of doors. Hence the danger of fuel or combustion gas escaping into a confined indoor space is greatly reduced. The combustion apparatus and heater unit are located at the high point in the water circulation system, which is of great advantage in providing hot water space heating in homes without a basement. The only "chimney" required is the vent pipe, which may be an ordinary metallic pipe of modest diameter. And the apparatus lends itself admirably to all the thermostatic and other automatic controls developed to operate conventional water heating furnaces.

I claim:

1. In submerged combustion heating apparatus comprising a combustion chamber having an ignition zone adjacent one end thereof and a combustion zone of substantial length extending therefrom, means for introducing and burning fuel in said combustion chamber, a heating chamber for containing a liquid to be heated, and a combustion gas delivery conduit for delivering hot combustion gas from said combustion chamber to beneath the surface of liquid in the heating chamber, the improvement comprising a combustion gas cooling chamber surrounding both the ignition and combustion zones of said combustion chamber over substantially their entire lengths and defining a passage through which combustion gas flows from the combustion chamber to said combustion gas delivery conduit, and a liquid preheating jacket surrounding said gas cooling chamber in heat exchange relation therewith over substantially its entire length and communicating with said heating chamber, whereby said combustion gas cooling chamber insulates the combustion chamber from cooling to below an efficient combustion temperature yet whereby the combustion gas is partially cooled and the liquid is preheated out of contact with each other preliminary to final heating of the liquid by direct contact with the combustion gas in said heating chamber.

2. In submerged combustion heating apparatus comprising a combustion chamber having an ignition zone adjacent one end thereof and a combustion zone of substantial length extending therefrom, means for introducing and burning fuel in said combustion chamber, a heating chamber for containing a liquid to be heated, and a combustion gas delivery conduit for delivering hot combustion gas from said combustion chamber to beneath the surface of liquid in the heating chamber, the improvement comprising a combustion gas cooling chamber surrounding both the ignition and combustion zones of said combustion chamber over substantially their entire lengths, said gas cooling chamber communicating at one end with said combustion chamber and at the other end with said gas delivery conduit, and a liquid preheating jacket surrounding said gas cooling chamber in heat exchange contact therewith over substantially its entire length and communicating with said heating chamber, whereby combustion gas flowing from the combustion chamber to the gas delivery conduit is partially cooled and liquid in said jacket is preheated out of contact with each other preliminary to final heating of the liquid by direct contact with the combustion gas in the heating chamber.

3. Submerged combustion heating apparatus comprising a tubular combustion chamber having an ignition zone adjacent one end thereof and a combustion zone of substantial length extending therefrom, an annular combustion gas cooling chamber surrounding both the ignition and combustion zones of said combustion chamber over substantially their entire lengths, an annular liquid preheating jacket surrounding and in heat exchange relation with said gas cooling chamber over substantially its entire length, a heating chamber for containing a liquid to be heated, and a combustion gas delivery conduit communicating with the gas cooling chamber and extending to beneath the surface of liquid in the heating chamber, said combustion chamber communicating with said gas cooling chamber at a point remote from the delivery conduit, and said liquid preheating jacket communicating with said heating chamber.

4. Submerged combustion heating apparatus comprising a vertically disposed tubular combustion chamber having an ignition zone at its upper end and a combustion zone of substantial length extending downwardly therefrom and open at its lower end, a ceramic ignition tube extending into the ignition zone at the upper end of said combustion chamber, means for introducing and igniting fuel in said ignition tube, a vertically disposed heat exchange tube surrounding said combustion chamber in spaced relation therewith throughout substantially the entire combined length of the ignition and combustion zones thereof, said heat exchange tube having its lower end closed and spaced from the lower end of the combustion tube, a tubular jacket surrounding said heat exchange tube throughout substantially the entire length thereof in spaced relation therewith, a heating chamber for containing a liquid to be heated communicating with the interior of said jacket adjacent the upper end thereof, and a combustion gas delivery conduit communicating with the interior of said heat exchange tube adjacent the upper end thereof and extending to beneath the surface of liquid in the heating chamber.

5. Apparatus according to claim 3, characterized in that communication between the liquid preheating jacket and the heating chamber is provided by a liquid conduit disposed wholly below the normal level of liquid in the system, and said gas delivery conduit extends for at least a part of its length to a height substantially above the normal level of liquid in the system, thereby to prevent liquid from backing up through the delivery conduit into the gas cooling chamber.

6. Apparatus according to claim 1, characterized in that a check valve is associated with said delivery conduit for preventing a back flow of liquid from passing through said conduit into said gas cooling chamber.

7. Apparatus according to claim 1, including a combustion gas by-pass conduit communicating with the gas cooling chamber and vented to the atmosphere, and a valve in said by-pass conduit, whereby combustion gases may be caused to by-pass the heating chamber during the initial warm-up of the combustion chamber.

8. Apparatus according to claim 3 including a combustion gas by-pass conduit communicating with the combustion chamber and vented to the atmosphere, a normally open valve in said by-pass conduit, and closing means for said valve actuated by an increase in temperature of the combustion gases to above a predetermined warm-up temperature, whereby combustion gas may be caused to by-pass the heating chamber during initial warm-up of the combustion chamber.

9. In apparatus according to claim 1, a vent conduit communicating with the heating chamber and providing for venting of spent combustion gas to the atmosphere, a combustion gas by-pass conduit directly connecting the gas cooling chamber with the vent conduit, and a thermostatically controlled valve in said by-pass conduit responsive to the temperature of combustion gas adjacent the exit from the gas cooling chamber, whereby said valve is maintained open and the combustion gas is enabled to by-pass the heating chamber until the temperature of the combustion gas adjacent the exit from the gas cooling chamber rises to a predetermined value and causes said valve to close.

10. Submerged combustion heating apparatus comprising a vertically disposed tubular combustion chamber open at its lower end, means for introducing and igniting fuel in said combustion chamber, a vertically disposed heat exchange tube surrounding said combustion chamber in spaced relation therewith and defining an annular combustion gas cooling chamber surrounding the combustion chamber, said heat exchange tube having its lower end closed and spaced from the lower end of the combustion tube, a tubular jacket surrounding and spaced from said heat exchange tube, a heating chamber for containing a liquid to be heated communicating with the interior of said jacket adjacent the upper end thereof, a combustion gas delivery conduit communicating with said gas cooling chamber adjacent the upper end thereof and extending to beneath the surface of liquid in the heating chamber, a vent conduit communicating with the heating chamber and providing for venting of spent combustion gas to the atmosphere, a by-pass conduit directly connecting the upper end of the gas cooling chamber with said vent conduit, a valve in said by-pass conduit, and thermostatic control means for said valve including a temperature sensing element extending into the path of flow of the combustion gas adjacent the upper end portion of said gas cooling chamber, whereby said valve is maintained open and combustion gas is enabled to by-pass the heating chamber until the temperature of the combustion gas in the upper end of the gas cooling chamber rises to a predetermined value and causes said valve to close.

11. Submerged combustion heating apparatus comprising a vertically disposed tubular combustion chamber open at its lower end, means for introducing and igniting fuel in said combustion chamber, a vertically disposed heat exchange tube surrounding said combustion chamber in spaced relation therewith and defining an annular combustion gas cooling chamber surrounding the combustion chamber, said heat exchange tube having its lower end closed and spaced from the lower end of the combustion tube, a tubular jacket surrounding and spaced from said heat exchange tube, a heating chamber for containing a liquid to be heated communicating with the interior of said jacket adjacent the upper end thereof, a combustion gas delivery conduit communicating with said gas cooling chamber adjacent the upper end thereof and extending to beneath the surface of liquid in the heating chamber, said gas delivery conduit extending for a part of its length to a height substantially above the normal surface level of the liquid to be heated, a vent conduit communicating with the heating chamber and providing for venting of spent combustion gas to the atmosphere, a by-pass conduit directly connecting the upper end of the gas cooling chamber with said vent conduit, a valve in said by-pass conduit, and thermostatic control means for said valve including a temperature sensing element extending into the path of flow of the combustion gas adjacent the upper end portion of said gas cooling chamber, whereby said valve is maintained open and combustion gas is enabled to by-pass the heating chamber until the temperature of the combustion gas in the upper end of the gas cooling chamber rises to a predetermined value and causes said valve to close.

12. Submerged combustion heating apparatus comprising a combustion chamber, means for introducing and burning fuel in said combustion chamber, a combustion gas cooling chamber disposed about said combustion chamber, a liquid preheating jacket disposed in heat exchange contact with said gas cooling chamber and having an inlet and an outlet, a gas lift heating chamber having an inlet connected to the outlet from said preheating jacket and having an outlet connected through return conduits to the inlet to said preheating jacket, whereby liquid may circulate from the preheating jacket to the heating chamber and thence back again to the preheating jacket, and a combustion gas delivery conduit for delivering combustion gas from the combustion gas cooling chamber to beneath the surface of liquid in the heating chamber, whereby final heating of the liquid and circulation thereof through the system are both effected by introduction of the combustion gas into direct contact with the liquid in the gas lift heating chamber.

References Cited in the file of this patent

UNITED STATES PATENTS

| | | |
|---|---|---|
| 587,375 | Siddle et al. | Aug. 3, 1897 |
| 594,858 | Christopher | Dec. 7, 1897 |
| 1,915,132 | Langford et al. | June 20, 1933 |
| 2,025,695 | Stewart | Dec. 24, 1935 |
| 2,358,302 | Brosius | Sept. 19, 1944 |
| 2,375,840 | Ekstrom | May 15, 1945 |
| 2,536,608 | Kemp | Jan. 2, 1951 |
| 2,556,984 | Smith | June 12, 1951 |
| 2,594,063 | Norman | Apr. 22, 1952 |